June 13, 1950 J. J. MAHONEY, JR 2,511,645

BROAD BAND ATTENUATOR

Filed Nov. 8, 1947

INVENTOR
J. J. MAHONEY
BY Hugh S. Wertz
ATTORNEY

Patented June 13, 1950

2,511,645

UNITED STATES PATENT OFFICE 2,511,645

BROAD BAND ATTENUATOR

John J. Mahoney, Jr., Lynbrook, N. Y., assignor to Bell Telephone Laboratories, Incorporated, New York, N. Y., a corporation of New York Application November 8, 1947, Serial No. 784,787

5 Claims. (Cl. 178—44)

Figure 1:
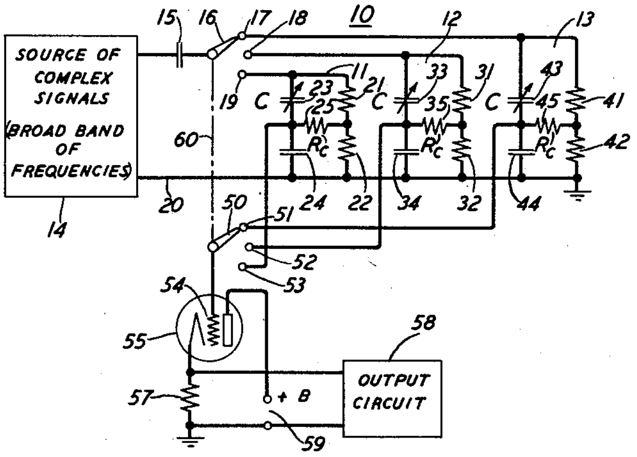

This invention relates to broad band attenuators and more specifically to attenuating networks which can pass without distortion complex wave forms comprising both low and high frequency components, such as step voltages or square-topped pulses, for example.

Oscilloscopes and other measuring and indicating instruments frequently require variable attenuators since the signals of interest tend to vary over a wide range. When the signal strength is grater than that for which the amplifiers or other portions of the circuit are designed, some means, such as adjustable attenuating networks of resistance or capacity or both, are necessary to reduce the signals to the proper intensity.

For low frequency signals, resistance potential dividers have been found to be satisfactory but for wider bands, that is, bands employing both low frequencies (such as, for example, those below a thousand cycles per second) and also very high frequencies (that is, for example, a megacycle or larger), attenuating networks comprising resistance and capacitance potential dividers (each resistor being shunted by a capacitor) have been used. Such resistor-capacitor potential dividers have been found to have a defect at high frequencies since commercial resistors tend to have a frequency characteristic such that the resistances thereof go down at high frequencies, frequently by different amounts. It has been discovered that this has the effect of causing a rounding of the corners of the square-topped waves which indicates that certain frequency components are being discriminated against. While some improvement has been noted when very high quality resistors are used, a slight rounding of the corners is still noticeable. The present invention relates to the alleviation of this defect.

It is an object of this invention to attenuate a signal made up of both low frequency and high frequency components with a minimum of distortion.

It is another object of this invention to produce attenuators capable of passing with a minimum of distortion waves having a wide band of frequencies and which make use of common commercial-type resistors and capacitors.

In carrying these objects into effect, there is provided, in accordance with the invention, an attenuator capable for use with an oscilloscope and comprising a group of potential dividers any one of which can be switched into service to produce attenuation of the input signal by a known amount. Each potential divider comprises two resistances connected in series in a path between the input terminals and two capacity members also connected in series in a second path between these terminals, the common terminal of the two resistance members being connected to the common terminal of the two capacity members through a resistance member. It has been discovered that this last-mentioned resistance member prevents the rounding of the corners of square-topped waves or step voltages noted when the resistance member was replaced by a direct connection. The output terminals of each potential divider are connected to the terminals of one of the capacity members of the divider. It has been found that best results are produced when the resistance member (added in accordance with this invention to the resistor-capacitor attenuator of the prior art described above) is relatively large, that is, of the order of one-half megohm or larger.

Figure 2:
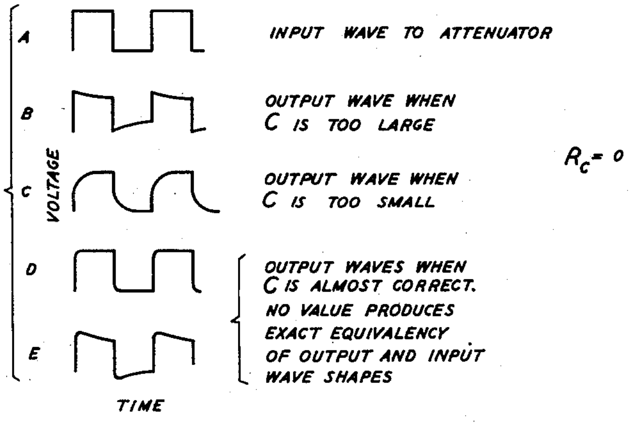
Figure 3:
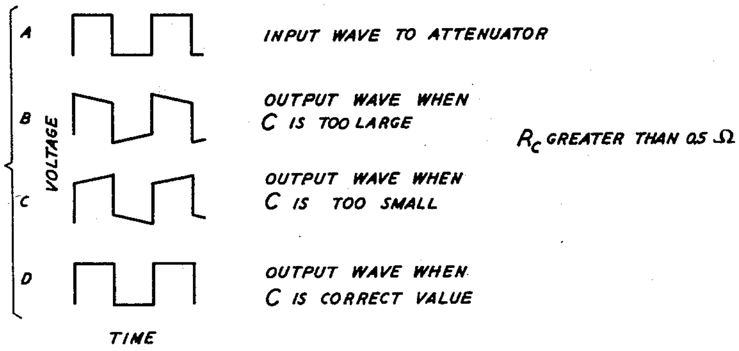

The invention will be more readily understood by referring to the following description taken in connection with the accompanying drawings forming a part thereof in which:

Fig. 1 is a schematic diagram of a system employing a plurality of potential dividers in accordance with the invention; and Figs. 2 and 3 are graphical representations to aid in the understanding of the invention.

Referring more specifically to the drawing, Fig. 1 shows, by way of example for purposes of illustrating the invention, a circuit 10 employing three attenuators 11, 12 and 13 in accordance with the invention. The attenuators are connected to a source of complex signals 14 through a coupling condenser 15 and a switch 16 connected respectively to taps 17, 18 and 19. The signals produced by the source 14 may be, for example, of the type known as square-topped waves or the type known as step signals. Each of these complex signals has embodied therein both low frequencies (that is, for example, those below 1,000 cycles) and very high frequencies (that is, those over a megacycle). A typical square-topped wave produced by the source 14 is shown in line A of Figs. 2 and 3.

Connected between the input tap 19 and the line 20, which may, for example, be grounded, is the attenuator 11 comprising serially connected resistors 21 and 22 and serially connected capacitors 23 and 24. The common terminal of the resistors 21 and 22 is connected to the common terminal of the capacitors 23 and 24 through the resistor 25. The ratio of the resistors 21 and 22 is substantially equal to the ratio of the capacities of the capacitors 24 and 23.

Similarly, connected between the input tap 18 and the line 20 is the attenuator 12 comprising serially connected resistors 31 and 32 and serially connected capacitors 33 and 34, the common terminal of the resistors being connected to the common terminal of the capacitors through the resistor 35. Also, connected between the input tap 17 and the line 20 is the attenuator 13 comprising serially connected resistors 41 and 42 and serially connected capacitors 43 and 44, the common terminal of the resistors being connected to the common terminal of the capacitors by means of the resistor 45. As in the case of the attenuator 11, the ratio of the resistors 31 and 32 is substantially equal to the ratio of the capacities of the capacitor members 34 and 33 and the ratio of the resistors 41 and 42 is substantially equal to the ratio of the capacities of the capacitor members 44 and 43 although the ratios of the respective attenuators 11, 12 and 13 are made different to produce different attenuation. The values of the resistors 25, 35 and 45 are not critical but it has been found that a value above ½ megohm produces satisfactory results. By way of example, each of the resistors 25, 35 and 45 may have the value of 680,000 ohms even though the ratios of the serially-connected resistances in the respective attenuators 11, 12 and 13 are different.

The common terminal of the capacitors 23 and 24 is connected to the output tap 53 of the switch 50, the common terminal of the capacitors 33 and 34 is connected to the output tap 52 of the switch and the common terminal of the capacitors 43 and 44 is connected to the output tap 51 of this switch. The switch 50 is connected to the input terminal 54 of a vacuum tube 55 connected as a cathode follower. This tube can have connected thereto, for example, an input resistor 56 of relatively high resistance and a cathode resistor 57 connected to suitable output circuit 58 which may be a cathode ray oscilloscope. The anode-cathode circuit of the tube 55 includes a source 59 of B-voltage and the cathode resistor 57. The switches 16 and 50 are adapted to be operated together and a mechanical connection 60 has been shown on the drawing to indicate this.

Reference will now be made to Fig. 2 which shows a group of wave shapes for an attenuator 11, 12 or 13 assuming that the resistor 25, 35 or 45, as the case may be, (designated in Fig. 2 as $R_c$) is zero, or in other words, assuming that the resistor 25, 35 or 45 is replaced by a direct connection. Line A in Fig. 2 shows the input wave produced by the source 14 and applied through the switch 16 and a tap 17, 18 or 19 to the selected attenuator 11, 12 or 13. Line B of Fig. 2 shows the output wave when the capacitor C (the variable condenser 23 in attenuator 11, the variable capacitor 33 in attenuator 12, or the variable capacitor 43 in attenuator 13) is too large, while line C of Fig. 2 shows the output wave when the capacitor C is too small. Lines D and E show the output wave when the capacitor C is almost correct to produce no rounding of the corners of the wave. No value of C was found to produce an exact equivalency of the output and input wave shapes when $R_c$ is equal to zero.

Fig. 3 shows wave shapes similar to those of Fig. 2 when the resistor $R_c$ has a value greater than 0.5 megohm. In this figure, line A represents an input wave which is similar to that shown in line A of Fig. 2. Line B shows an output wave when the variable capacitor C (23, 33 or 43) is too large, line C shows the output wave when this capacitor C is too small, while D shows the output wave when C has the correct value. It will be noted that in this line of Fig. 3 the rounding of the corners of the waves shown in Fig. 2 is not present and the wave shown in line D of Fig. 3 is of the same shape as the input wave shown in line A of that figure. In other words, the presence of a fairly high resistance between the common terminals of the resistor potential divider and of the capacitor potential divider making up each of the attenuators 11, 12 or 13 removes the rounding of the corners which would be present if this resistor were not used. This rounding is believed to be caused by the changing of the ratio of the resistances of commercial resistors at high frequency although it might be due to other causes. Whatever the cause, however, it has been noticed experimentally that the effect of the added resistor $R_c$ is to produce a decided improvement in the output wave shape where the input wave comprises a wide band of frequencies. This invention makes it possible to use as the resistors of the potential divider the high quality wire-wound type which have many excellent qualities which make their use desirable in many cases were it not for the fact that their high frequency characteristics are poor.

Typical values of resistance capacities which can be used are as follows:

Resistance 21=1 megohm
Resistance 22=1000 ohms
Resistance 31=1 megohm
Resistance 32=10,000 ohms
Resistance 41=900,000 ohms
Resistance 42=100,000 ohms
Resistances 25, 35 and 45=680,000 ohms each
Resistance 57=160 ohms
Capacities 23, 33 and 43=10 to 20 mmf. each (adjustable)
Capacity 24=15,000 mmf.
Capacity 34=1500 mmf.
Capacity 44=150 mmf.
Capacity 15=0.5 mf.

Various changes can be made in the embodiment as above described without departing from the spirit of the invention the scope of which is indicated in the claims.

What is claimed is:

1. The combination with a source of signals of multiple frequency including at least one frequency below a kilocycle and at least one frequency above a megacycle, of an attenuating network to which said source is connected, said network comprising a first resistor and a second resistor serially connected between the terminals of said source, a first capacitor and a second capacitor serially connected between the terminals of said source in such a manner that one terminal of the first resistor and one terminal of the first capacitor are connected to one terminal of the source and one terminal of the second resistor and one terminal of the second capacitor are connected to the other terminal of the source, the ratio of the first resistance to the second resistance at frequencies below a kilocycle being substantially equal to the ratio of the second capacitor to the first capacitor at the same frequencies, a third resistor connected between the common terminal of the first and second resistors and the common terminal of said capacitors, and output terminals connected to the terminals of said second capacitor.

2. The combination with a source of signals of multiple frequency including at least one frequency below a kilocycle and at least one frequency above a megacycle, of an attenuating network to which said source is connected, said network comprising a plurality of attenuators each of which comprises two input and two output terterminals, two resistance members having a common terminal connected in series in a first path between the two input terminals, two capacity members having a common terminal and connected in a second path between the two input terminals, a third resistance member connected between the common terminal of the two resistances and the common terminal of the two capacity members, and means for connecting the said output terminals to the terminals of one of said capacity members.

3. The combination with a source of signals of multiple frequency including at least one frequency below a kilocycle and at least one frequency above a megacycle, of an attenuating network to which said source is connected, said network comprising a plurality of attenuators each of which comprises two input and two output terminals, two resistance members having a common terminal and being connected in series in a first path between the two input terminals, two capacity members having a common terminal and being connected in series in a second path between the two input terminals, a third resistance member connected between the common terminal of the two resistance members and the common terminal of the two capacity members and means for connecting the said output terminals to the terminals of one of said capacity members, the ratio of the two serially-connected resistance members in each attenuator being different from the ratio of the corresponding resistance members in each of the other attenuators.

4. The combination with a source of signals of multiple frequency including at least one frequency below a kilocycle and at least one frequency above a megacycle, of an attenuating network to which said source is connected, and an output circuit, said network comprising a plurality of attenuators each of which comprises two input and two output terminals, two resistance members having a common terminal and being connected in series in a first path between the two input terminals, two capacity members having a common terminal and being connected in a second path between the two input terminals, a third resistance member connected between the common terminal of the two resistance members and the common terminal of the two capacity members, means for connecting the said output terminals to the terminals of one of said capacity members, the ratio of the two serially-connected resistance members in each attenuator being different from the ratio of the corresponding resistance members in each of the other attenuators, and switching means for selectively connecting one of said attenuators to the source of signals and for connecting said selected attenuator to the output circuit.

5. The combination of elements as in claim 4 in which said third resistance member of each attenuator is of a value greater than one-half megohm.

JOHN J. MAHONEY, Jr.,

No references cited.